US009471332B2

(12) United States Patent
Li et al.

(10) Patent No.: US 9,471,332 B2
(45) Date of Patent: Oct. 18, 2016

(54) SELECTING GRAPHICAL COMPONENT TYPES AT RUNTIME

(75) Inventors: Xin Li, Austin, TX (US); Gregory Wayne Roberts, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 10/967,958

(22) Filed: Oct. 19, 2004

(65) Prior Publication Data
US 2006/0085754 A1    Apr. 20, 2006

(51) Int. Cl.
*G06F 9/44*    (2006.01)

(52) U.S. Cl.
CPC .................................. *G06F 9/4443* (2013.01)

(58) Field of Classification Search
CPC .................................................... G06F 9/4443
USPC ................... 715/762, 763, 760, 764–765
See application file for complete search history.

(56) References Cited

U.S. PATENT DOCUMENTS

| | | | | |
|---|---|---|---|---|
| 5,754,173 A * | 5/1998 | Hiura et al. | | 715/744 |
| 5,764,226 A * | 6/1998 | Consolatti et al. | | 715/747 |
| 5,806,080 A * | 9/1998 | Purple et al. | | 715/515 |
| 5,818,445 A * | 10/1998 | Sanderson et al. | | 715/744 |
| 5,889,942 A * | 3/1999 | Orenshteyn | | 726/3 |
| 5,905,492 A * | 5/1999 | Straub et al. | | 715/744 |
| 5,917,487 A * | 6/1999 | Ulrich | | 715/765 |
| 5,959,624 A * | 9/1999 | Johnston et al. | | 715/746 |
| 6,072,486 A * | 6/2000 | Sheldon et al. | | 715/835 |
| 6,105,066 A * | 8/2000 | Hayes, Jr. | | 709/226 |
| 6,128,010 A * | 10/2000 | Baxter et al. | | 715/846 |
| 6,188,399 B1 * | 2/2001 | Voas et al. | | 715/723 |
| 6,219,032 B1 * | 4/2001 | Rosenberg et al. | | 345/157 |
| 6,278,448 B1 * | 8/2001 | Brown et al. | | 715/866 |
| 6,278,449 B1 * | 8/2001 | Sugiarto et al. | | 715/826 |
| 6,327,628 B1 * | 12/2001 | Anuff et al. | | 719/311 |
| 6,342,907 B1 * | 1/2002 | Petty et al. | | 715/762 |
| 6,392,671 B1 * | 5/2002 | Glaser | | 715/765 |
| 6,628,305 B1 * | 9/2003 | Hong et al. | | 715/734 |
| 6,664,981 B2 * | 12/2003 | Ashe et al. | | 715/765 |
| 6,677,962 B1 * | 1/2004 | Bailey | | G06F 9/4443 715/744 |
| 6,686,934 B1 * | 2/2004 | Evans et al. | | 715/764 |
| 6,724,403 B1 * | 4/2004 | Santoro et al. | | 715/765 |
| 6,753,885 B2 * | 6/2004 | Stoakley et al. | | 715/762 |
| 6,859,212 B2 * | 2/2005 | Kumar et al. | | 715/744 |
| 6,901,554 B1 * | 5/2005 | Bahrs et al. | | 715/526 |
| 6,941,521 B2 * | 9/2005 | Lin et al. | | 715/762 |
| 6,968,449 B1 * | 11/2005 | Sierra et al. | | 713/1 |
| 6,990,654 B2 * | 1/2006 | Carroll, Jr. | | 717/109 |
| 7,030,890 B1 * | 4/2006 | Jouet et al. | | 345/619 |
| 7,243,336 B2 * | 7/2007 | Brockway et al. | | 717/120 |
| 7,380,236 B2 * | 5/2008 | Hawley | | G06F 9/4443 717/109 |
| 7,603,624 B2 * | 10/2009 | Bent et al. | | 715/744 |
| 7,657,842 B2 * | 2/2010 | Matthews et al. | | 715/788 |
| 7,681,112 B1 * | 3/2010 | Francis | | 715/201 |

(Continued)

*Primary Examiner* — Amy Ng
*Assistant Examiner* — William Wong
(74) *Attorney, Agent, or Firm* — Yee & Associates, P.C.; Stephen Yoder (57) ABSTRACT

A system, apparatus and method of selecting graphical component types at runtime are provided. When a graphical component is to be displayed in a GUI, which usually has a type, the type of the GUI is first determined. Type in this case used to signify a look, feel and behavior that are to be exhibited by the graphical component. After determining the type of the GUI, the graphical component may be created based on the type of the GUI. After it has been created, the graphical component will be displayed in the GUI.

19 Claims, 11 Drawing Sheets

```
[001]  <applications>
[002]    <application id="100" type="taskList">
[003]      <configurationItems>
[004]        <configurationItem type="string">
[005]          <name>title</name>
[006]          <values>
[007]            <default>Task List</default>
[008]            <value locale="de_DE">DE-Task List</value>
[009]            <value locale="ja_JP">JP-Task List</value>
[010]          </values>
[011]        </configurationItem>
[012]      </configurationItems>
[013]    </application>

[014]    <application id="101" type="shutdown">
[015]      <configurationItems>
[016]        <configurationItem type="string">
[017]          <name>title</name>
[018]          <values>
[019]            <default>Shutdown</default>
[020]            <value locale="de_DE">DE-Shutdown</value>
[021]            <value locale="ja_JP">JP-Shutdown</value>
[023]          </values>
[024]        </configurationItem>
[025]        <configurationItem type="file">
[026]          <name>icon</name>
[027]          <values>
[028]            <default>shutdown.gif</default>
[029]          </values>
[030]        </configurationItem>
[031]      </configurationItems>
[032]    </application>

[033]    <application id="102" type="logoff">
[034]      <configurationItems>
[035]        <configurationItem type="string">
[036]          <name>title</name>
[037]          <values>
[038]            <default>Logoff</default>
[039]            <value locale="de_DE">DE-Logoff</value>
[040]            <value locale="ja_JP">JP-Logoff</value>
[041]          </values>
[042]        </configurationItem>
[043]        <configurationItem type="file">
```

(56) References Cited

U.S. PATENT DOCUMENTS

| | | | |
|---|---|---|---|
| 2001/0043235 A1* | 11/2001 | Best et al. | 345/781 |
| 2001/0045961 A1* | 11/2001 | Stoakley et al. | 345/744 |
| 2001/0048448 A1* | 12/2001 | Raiz et al. | 345/700 |
| 2001/0051907 A1* | 12/2001 | Kumar et al. | 705/36 |
| 2001/0051961 A1* | 12/2001 | Duxbury | 707/517 |
| 2002/0023122 A1* | 2/2002 | Polizzi et al. | 709/202 |
| 2002/0057290 A1* | 5/2002 | Wilkinson et al. | 345/744 |
| 2002/0080200 A1* | 6/2002 | Wong et al. | 345/969 |
| 2002/0101448 A1* | 8/2002 | Sanderson | 345/762 |
| 2002/0113777 A1* | 8/2002 | Lauderdale | 345/168 |
| 2002/0120673 A1* | 8/2002 | Tolson et al. | 709/202 |
| 2002/0129106 A1* | 9/2002 | Gutfreund | 709/205 |
| 2002/0130900 A1* | 9/2002 | Davis | 345/744 |
| 2002/0138331 A1* | 9/2002 | Hosea et al. | 705/10 |
| 2002/0149618 A1* | 10/2002 | Estrada et al. | 345/760 |
| 2002/0149629 A1* | 10/2002 | Craycroft | G06F 9/4443 715/861 |
| 2002/0188434 A1* | 12/2002 | Shulman et al. | 703/21 |
| 2003/0020671 A1* | 1/2003 | Santoro et al. | 345/1.3 |
| 2003/0046401 A1* | 3/2003 | Abbott et al. | 709/228 |
| 2003/0055878 A1* | 3/2003 | Fletcher et al. | 709/203 |
| 2003/0070061 A1* | 4/2003 | Wong et al. | 712/220 |
| 2003/0073063 A1* | 4/2003 | Dattaray et al. | 434/350 |
| 2003/0110448 A1* | 6/2003 | Haut et al. | 715/513 |
| 2003/0117437 A1* | 6/2003 | Cook et al. | 345/764 |
| 2003/0158975 A1* | 8/2003 | Frank et al. | 709/331 |
| 2003/0167315 A1* | 9/2003 | Chowdhry et al. | 709/218 |
| 2003/0189597 A1* | 10/2003 | Anderson et al. | 345/778 |
| 2004/0003096 A1* | 1/2004 | Willis | 709/228 |
| 2004/0003097 A1* | 1/2004 | Willis et al. | 709/228 |
| 2004/0006476 A1* | 1/2004 | Chiu | G10L 15/22 704/270.1 |
| 2004/0046789 A1* | 3/2004 | Inanoria | 345/748 |
| 2004/0095378 A1* | 5/2004 | Vigue et al. | 345/723 |
| 2004/0107249 A1* | 6/2004 | Moser et al. | 709/204 |
| 2004/0113951 A1 | 6/2004 | Brockway | |
| 2004/0155909 A1* | 8/2004 | Wagner | 345/854 |
| 2004/0183831 A1* | 9/2004 | Ritchy et al. | 345/762 |
| 2005/0021935 A1* | 1/2005 | Schillings et al. | 713/1 |
| 2005/0038868 A1* | 2/2005 | Spicer | 709/217 |
| 2005/0050301 A1* | 3/2005 | Whittle et al. | 712/32 |
| 2005/0108732 A1* | 5/2005 | Musson | G06F 3/0482 719/328 |
| 2005/0114361 A1* | 5/2005 | Roberts et al. | 707/100 |
| 2005/0193368 A1* | 9/2005 | Becker et al. | 717/106 |
| 2005/0193380 A1* | 9/2005 | Vitanov et al. | 717/143 |
| 2006/0005207 A1* | 1/2006 | Louch et al. | 719/328 |
| 2006/0015818 A1* | 1/2006 | Chaudhri et al. | 715/779 |
| 2006/0168536 A1* | 7/2006 | Portmann | 715/762 |
| 2007/0038934 A1* | 2/2007 | Fellman | 715/700 |
| 2007/0101297 A1* | 5/2007 | Forstall et al. | 715/841 |
| 2007/0106952 A1* | 5/2007 | Matas et al. | 715/764 |
| 2007/0203984 A2* | 8/2007 | AlHusseini et al. | 709/205 |

* cited by examiner

```
[001]    <applications>

[002]      <application id="100" type="taskList">
[003]        <configurationItems>
[004]          <configurationItem type="string">
[005]            <name>title</name>
[006]            <values>
[007]              <default>Task List</default>
[008]              <value locale="de_DE">DE-Task List</value>
[009]              <value locale="ja_JP">JP-Task List</value>
[010]            </values>
[011]          </configurationItem>
[012]        </configurationItems>
[013]      </application>

[014]      <application id="101" type="shutdown">
[015]        <configurationItems>
[016]          <configurationItem type="string">
[017]            <name>title</name>
[018]            <values>
[019]              <default>Shutdown</default>
[020]              <value locale="de_DE">DE-Shutdown</value>
[021]              <value locale="ja_JP">JP-Shutdown</value>
[023]            </values>
[024]          </configurationItem>
[025]          <configurationItem type="file">
[026]            <name>icon</name>
[027]            <values>
[028]              <default>shutdown.gif</default>
[029]            </values>
[030]          </configurationItem>
[031]        </configurationItems>
[032]      </application>

[033]      <application id="102" type="logoff">
[034]        <configurationItems>
[035]          <configurationItem type="string">
[036]            <name>title</name>
[037]            <values>
[038]              <default>Logoff</default>
[039]              <value locale="de_DE">DE-Logoff</value>
[040]              <value locale="ja_JP">JP-Logoff</value>
[041]            </values>
[042]          </configurationItem>
[043]          <configurationItem type="file">
```

FIG. 4(a)

```
[045]       <values>
[046]          <default>logoff.gif</default>
[047]       </values>
[048]     </configurationItem>
[049]    </configurationItems>
[050]  </application>

[051]  <application id="103" type="lockup">
[052]    <configurationItems>
[053]     <configurationItem type="string">
[054]       <name>title</name>
[055]       <values>
[056]          <default>Lockup</default>
[057]           <value locale="de_DE">DE-Lockup</value>
[058]           <value locale="ja_JP">JP-Lockup</value>
[059]       </values>
[060]     </configurationItem>
[061]     <configurationItem type="file">
[062]       <name>icon</name>
[063]       <values>
[064]          <default>lockup.gif</default>
[065]       </values>
[066]     </configurationItem>
[067]    </configurationItems>
[068]  </application>

[069]  <application id="104" type="exit">
[070]    <configurationItems>
[071]     <configurationItem type="string">
[072]       <name>title</name>
[073]       <values>
[074]          <default>Exit</default>
[075]           <value locale="de_DE">DE-Exit</value>
[076]           <value locale="ja_JP">JP-Exit</value>
[077]       </values>
[078]     </configurationItem>
[079]     <configurationItem type="file">
[080]       <name>icon</name>
[081]       <values>
[082]          <default>logoff.gif</default>
[083]       </values>
[084]     </configurationItem>
[085]    </configurationItems>
[086]  </application>
```

FIG. 4(b)

```
[087]    <application id="201" type="native">
[088]      <configurationItems>
[089]        <configurationItem type="string">
[090]          <name>title</name>
[091]          <values>
[092]            <default>Manage Files</default>
[093]            <value locale="de_DE">DE-Manage Files</value>
[094]            <value locale="ja_JP">JP-Manage Files</value>
[095]          </values>
[096]        </configurationItem>
[097]        <configurationItem type="composite">
[098]          <name>win32</name>
[099]          <configurationItems>
[100]            <configurationItem type="string">
[101]              <name>command</name>
[102]              <values>
[103]                <default>explorer.exe</default>
[104]              </values>
[105]            </configurationItem>
[106]          </configurationItems>
[107]        </configurationItem>
[108]        <configurationItem type="composite">
[109]          <name>linux</name>
[110]          <configurationItems>
[111]            <configurationItem type="string">
[112]              <name>command</name>
[113]              <values>
[114]                <default>nautilus</default>
[115]              </values>
[116]            </configurationItem>
[117]            <configurationItem type="string">
[118]              <name>arguments</name>
[119]              <values>
[120]                <default>--no-desktop</default>
[121]              </values>
[122]            </configurationItem>
[123]          </configurationItems>
[124]        </configurationItem>
[125]      </configurationItems>
[126]    </application>

[127] <application id="300" type="web">
[128]    <configurationItems>
[129]      <configurationItem type="string">
```

FIG. 4(c)

```
[130]      <name>title</name>
[131]      <values>
[132]        <default>Embedded Browser (IE)</default>
[133]        <value locale="de_DE">DE-Embedded Browser (IE)</value>
[134]        <value locale="ja_JP">JP-Embedded Browser (IE)</value>
[135]      </values>
[136]    </configurationItem>
[137]    <configurationItem type="string">
[138]      <name>embeddedBrowser</name>
[139]      <values>
[140]        <default>MSIE</default>
[141]      </values>
[142]    </configurationItem>
[143]    <configurationItem type="string">
[144]      <name>initialURL</name>
[145]      <values>
[146]        <default>http://www.eclipse.org</default>
[147]      </values>
[148]    </configurationItem>
[149]   </configurationItems>
[150] </application>

[151] <application id="600" type="java">
[152]   <configurationItems>
[153]    <configurationItem type="string">
[154]      <name>title</name>
[155]      <values>
[156]        <default>Java Application</default>
[157]        <value locale="de_DE">DE-Java Application</value>
[158]        <value locale="ja_JP">JP-Java Application</value>
[159]      </values>
[160]    </configurationItem>
[161]    <configurationItem type="file">
[162]      <name>icon</name>
[163]      <values>
[164]        <default>genspread.gif</default>
[165]      </values>
[166]    </configurationItem>
[167]    <configurationItem type="string">
[168]      <name>arguments</name>
[169]      <values>
[170]        <default>arg1 arg2</default>
[171]      </values>
[172]    </configurationItem>
[173]    <configurationItem type="composite">
```

FIG. 4(d)

```
[174]        <name>win32</name>
[175]        <configurationItems>
[176]          <configurationItem type="string">
[177]            <name>isJar</name>
[178]            <values>
[179]              <default>false</default>
[180]            </values>
[181]          </configurationItem>
[182]          <configurationItem type="string">
[183]            <name>classOrJarName</name>
[184]            <values>
[185]              <default>JavaAppTypeTest</default>
[186]            </values>
[187]          </configurationItem>
[188]          <configurationItem type="string">
[189]            <name>classpath</name>
[190]            <values>
[191] <default>\IBM\WCIste\bDesktop\lockdown\samples\eclipse\plugins\com.ibm.wci.samples_1.0.0\data</default>
[192]            </values>
[193]          </configurationItem>
[194]          <configurationItem type="composite">
[195]            <name>vmargs</name>
[196]            <configurationItems>
[197]              <configurationItem type="string">
[198]                <name>sample_JVM_arg</name>
[199]                <values>
[200]                  <default>sample_value</default>
[201]                </values>
[202]              </configurationItem>
[203]            </configurationItems>
[204]          </configurationItem>
[205]        </configurationItems>
[206]      </configurationItem>
[207]      <configurationItem type="composite">
[208]        <name>linux</name>
[209]        <configurationItems>
[210]          <configurationItem type="string">
[211]            <name>isJar</name>
[212]            <values>
[213]              <default>false</default>
[214]            </values>
[215]          </configurationItem>
[216]          <configurationItem type="string">
[217]            <name>classOrJarName</name>
```

FIG. 4(e)

```
[218]           <values>
[219]             <default>JavaAppTypeTest</default>
[220]           </values>
[221]         </configurationItem>
[222]         <configurationItem type="string">
[223]           <name>classpath</name>
[224]           <values>

[225] <default>/opt/IBM/WClste/bDesktop/lockdown/samples/eclipse/
        plugins/com.ibm.wci.samples_1.0.0/data</default>
[226]           </values>
[227]         </configurationItem>
[228]       </configurationItems>
[229]     </configurationItem>
[230]   </configurationItems>
[231] </application>
```

SELECTING GRAPHICAL COMPONENT TYPES AT RUNTIME

BACKGROUND OF THE INVENTION

1. Technical Field

The present invention is directed to software applications. More specifically, the present invention is directed to a system, apparatus and method of selecting graphical component types at runtime.

2. Description of Related Art

A dashboard is a graphical user interface (GUI) on which selectable application instances are displayed. Every application represented on the dashboard is an instance of a specific application type. An example of an application type is "System". An example of a System application type may be "shutdown". When an instance of a System application type has been configured with appropriate configuration information to shut the system down, the dashboard will display a graphical component which when selected will do so.

The display of graphical components may vary. For example, a graphical component may be displayed as a menu item or menuItem widget, a tree item or treeItem widget, a toolbar widget, a drop-down menu widget, a button et cetera. A widget is a software application written in JAVA™ (ORACLE® and JAVA are registered trademarks of Oracle and/or its affiliates).

Generally, if a dashboard is configured to be menu-based, the graphical components display thereon will be menuItem widgets. If the dashboard is instead configured to be tree-based, the graphical components that will be displayed on the dashboard will be treeItem widgets and so on. Further, if a dashboard is configured to be a full-fledged dashboard (i.e., the dashboard is configured to show all application instances with all their functionalities), a user will be able to access all the functionalities provided by the application instances. If, on the other hand, the dashboard is configured to be a minimalist dashboard (i.e., the dashboard is configured to show application instances with only tool tips, for example, and no functionalities), only the tool tips will be available to the user (i.e., the user should not be able to access any of the functionalities provided by the application instances).

Based on the above description, "type" in the context of the present invention will henceforth be used to refer to both the presentation of a selectable application instance or its "look and feel" (e.g., the display presentation of a shutdown graphical component or widget) on the dashboard and its behavior when selected (e.g., shutting down the system). Note that "type" used with dashboard and graphical component should not be confused with "type" used with application. "Type" used with application refers to the application program whereas "type used with dashboard and graphical component is used to refer to look, feel and behavior.

Presenting different types of graphical components while using the same data can be rather advantageous. For example, if an employee is very well accustomed with menu-driven dashboards, the dashboard used by the employee may be configured to be menu-based. If another employee is more familiar with tree-based dashboards, his/her dashboard may be configured to be tree-based. If both employees are from the same department, their dashboards, although are of different types, may nonetheless provide the same functionality. A visiting individual, on the other hand, may be provided with a minimalist dashboard for restricted functionality.

Since the same data is being used in all instances described above, there is a need to determine automatically the type of graphical components to display in each situation.

SUMMARY OF THE INVENTION

The present invention provides a system, apparatus and method of selecting graphical component types at runtime. When a graphical component is to be displayed in a GUI, which usually has a type, the type of the GUI is first determined. Type in this case is used to signify a look, feel and behavior that are to be exhibited by the graphical component. After determining the type of the GUI, the graphical component may be created based on the type of the GUI. After it has been created, the graphical component will be displayed in the GUI.

Generally, each graphical component in the GUI represents an instantiation of an application program. Hence, the program may be accessed through the graphical component. Obviously, programs that are not to be accessible to a user will not be represented on the GUI by a graphical component. Thus, the invention is ideal for situations where full accessibility to a system is to be limited and controlled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4(a)-4(f) depict an exemplary XML configuration file that may be used by the present invention.

DETAILED DESCRIPTION OF THE PREFERRED EMBODIMENT

Figure 1:
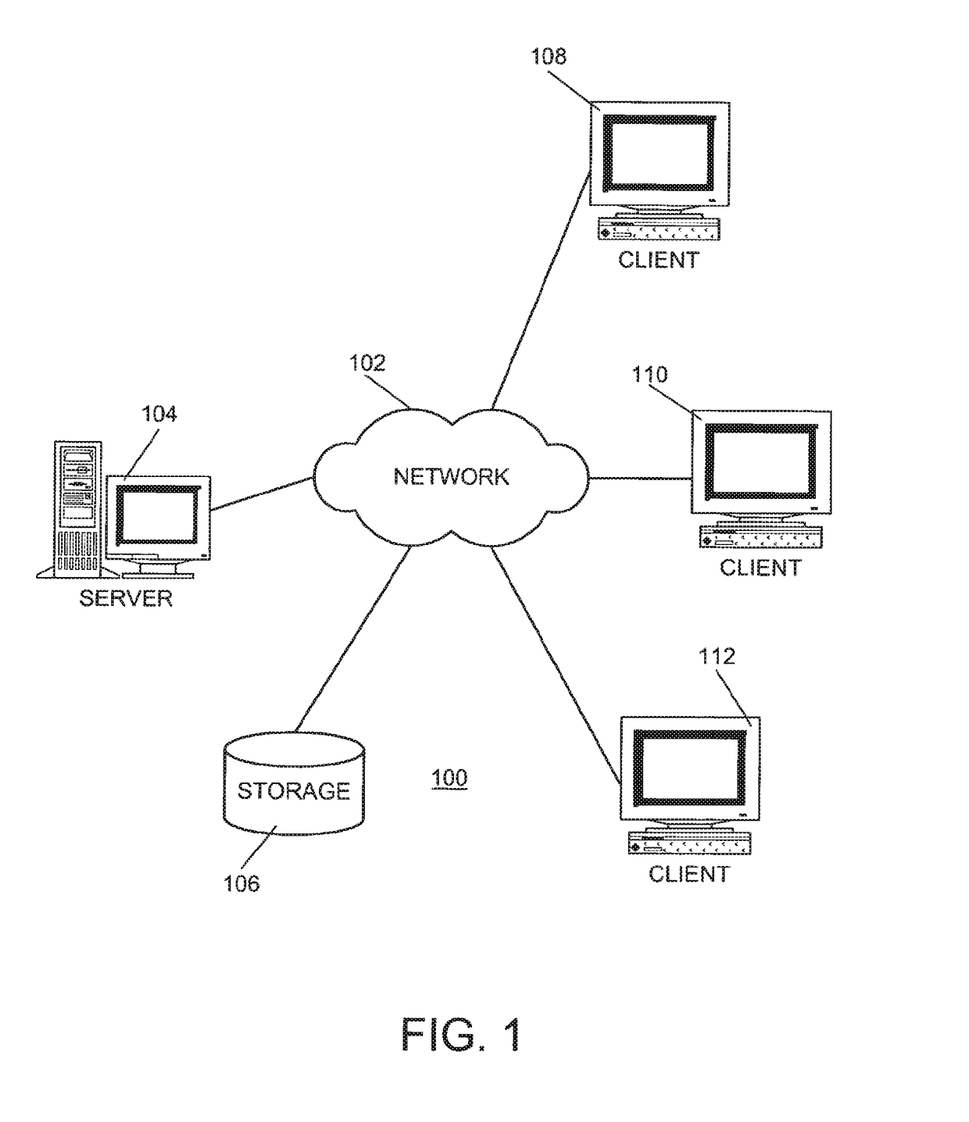
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the transmission control protocol/Internet protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
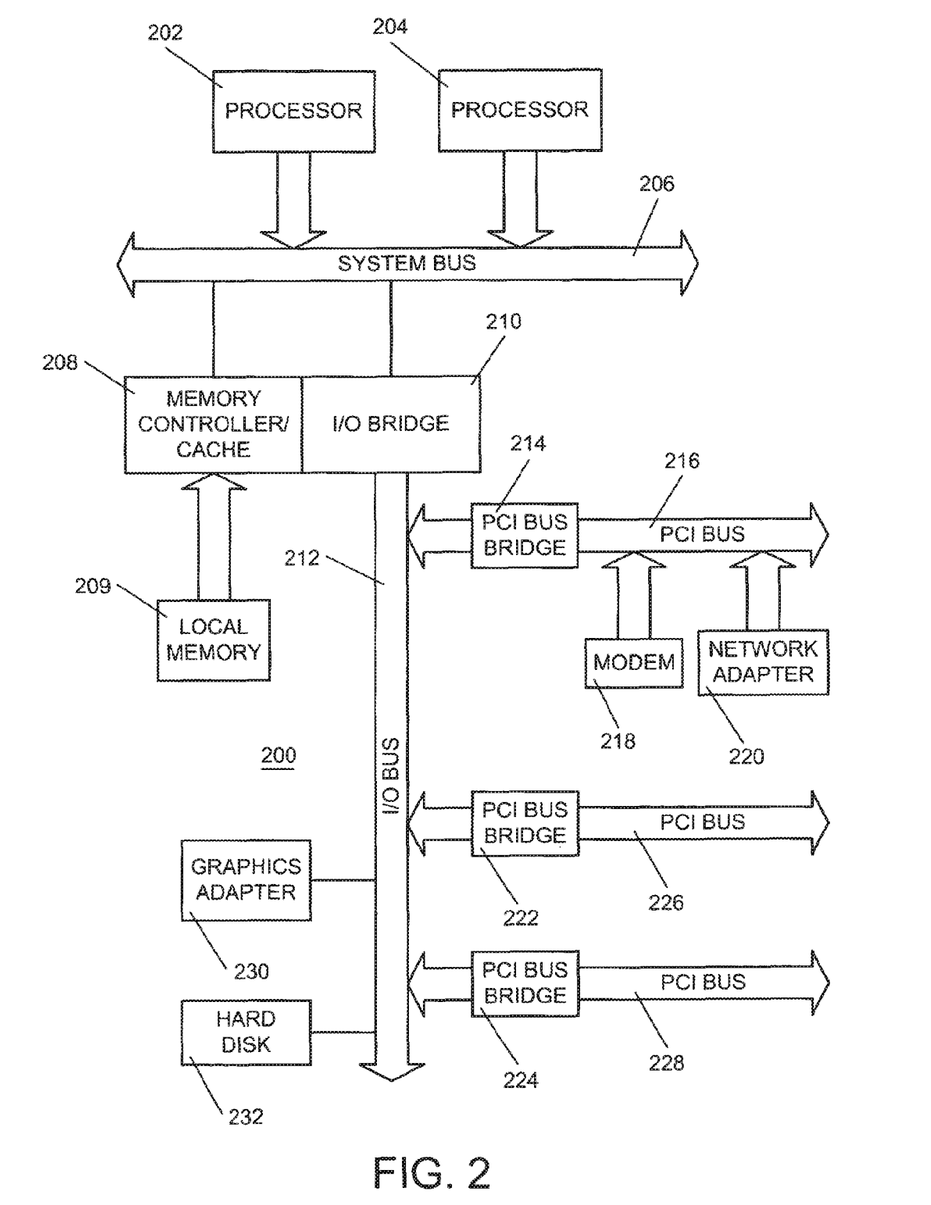
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. Input/output (I/O) bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® e-Server pSeries system, a product of International Business Machines Corporation in Armonk, New York, running the Advanced Interactive Executive (AIX®) operating system (IBM, e-Server, pSeries, and AIX are trademarks or registered trademarks of International Business Machines Corporation in the United States, other countries, or both) or LINUX® operating system (LINUX is a registered trademark of Linus Torvalds in the United States, other countries, or both).

Figure 3:
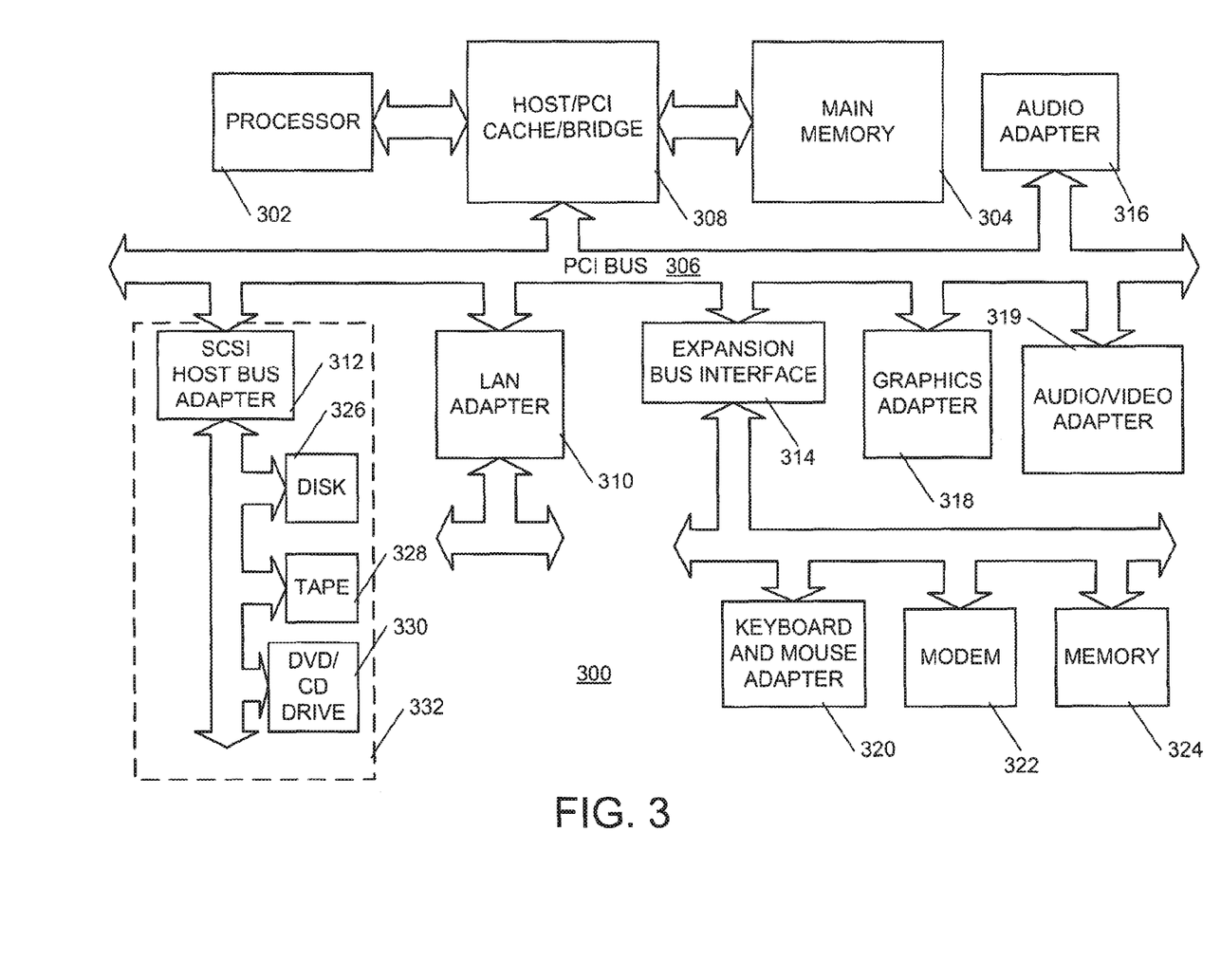
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and compact disk read-only-memory (CD-ROM) and digital versatile disk (DVD) CD-ROM/DVD drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as WINDOWS® XP™ (WINDOWS® XP™ are either registered trademarks or trademarks of Microsoft Corporation in the U.S.A. and/or other regions and/or countries) which is available from Microsoft Corporation. An object oriented programming system such as JAVA may run in conjunction with the operating system and provide calls to the operating system from JAVA programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 may also be a notebook computer or hand held computer in addition to taking the form of a PDA. Data processing system 300 also may be a kiosk or a Web appliance.

The present invention provides a system, apparatus and method of selecting graphical component types at runtime. The invention may be local to client systems 108, 110 and 112 of FIG. 1 or to the server 104 or to both the server 104 and clients 108, 110 and 112. Further, the present invention may reside on any data storage medium (i.e., floppy disk, compact disk, hard disk, ROM, random access memory (RAM), etc.) used by a computer system.

In implementing the invention, an application catalog is used. The application catalog is an extensible Markup Language (XML) file that contains ostensibly configuration information for all applications that may be displayed on a particular dashboard. The application catalog may be referred to as a configuration file since it contains configuration information for the applications listed therein. Consequently, XML configuration file and XML application catalog will henceforth be used interchangeably. The XML configuration file may be stored on server 104. Upon being turned on or reset, a client (i.e., any one of clients 108, 110 and 112) may download the XML configuration file from server 104.

Figure 4F:
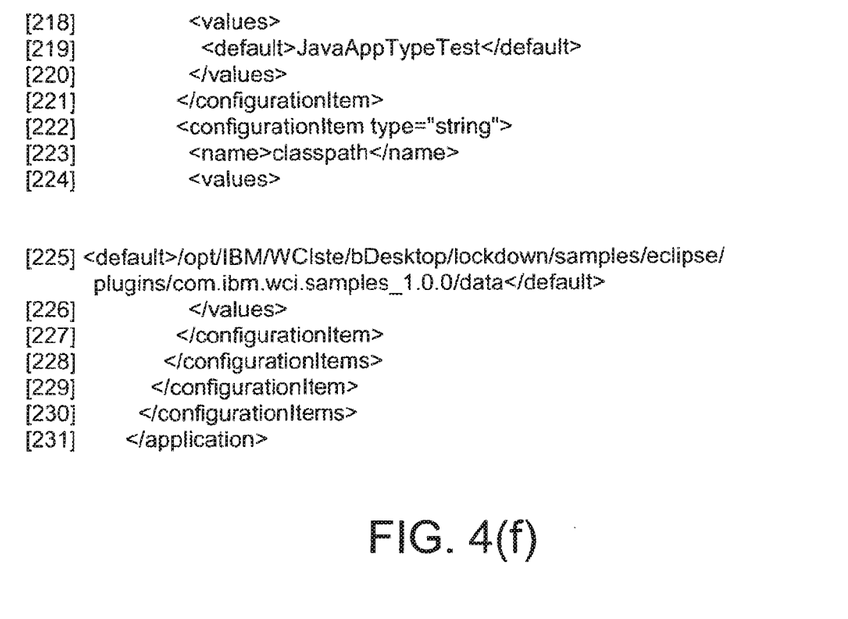

FIGS. 4(*a*)-4(*f*) depict an exemplary XML configuration file. The XML configuration file has a plurality of applications. The applications include (1) "tasklist" (see lines [002]-[013]); (2) "shutdown" on lines [014]-[032]; (3) "logoff" on lines [033]-[050]; (4) "lockup" on lines [051]-[068]; (5) "exit" on lines [069]-[086]; (6) "native" on lines [087]-[126]; (6) "web" on lines [127]-[150]; and (7) "java" on lines [151]-[234].

As mentioned earlier, an instance of each one of these applications may be displayed on a dashboard as a graphical component. When the "tasklist" graphical component is selected, a list of all currently open applications that are native to the operating system may be displayed. If the operating system is MICROSOFT® WINDOWS® operating system (MICROSOFT and WINDOWS are either registered trademarks or trademarks of Microsoft Corporation in the United States and/or other countries), for example, all open native WINDOWS applications will be displayed. In this regard, "tasklist" provides the same function as a WINDOWS task manager.

A "shutdown" graphical component, as described previously, may be used to shut the system down whereas a "logoff" or "lockup" graphical component may be used to log a user the system, or lock the system up so that no one else may use it, respectively. An "exit" graphical component may be used to exit the system in an emergency situation. A "native" graphical component gives a user access in a lockdown environment. If the access is to MICROSOFT WORD, for example, when the displayed graphical component is selected, MICROSOFT WORD will open. A "web" graphical component may open a Web browser and a "JAVA" graphical component may give a user access to the JAVA programming language.

In order not to obfuscate the disclosure of the invention, only the information in the XML configuration that is deemed pertinent for a thorough understanding of the invention will be explained. Specifically, only the information in the "tasklist" application (i.e., information on lines [002]-[013]) will be explained.

On line [002] a unique identification number (i.e., ID =100) is assigned to the application program. Unique IDs allow a system to distinguish one application program from another. Particularly, IDs are used for creating access control lists for client systems. In the example above where there are two employees working in the same department, the client systems used by both employees may be assigned the same set of IDs for accessibility. So, if applications 100, 101 and 201 were assigned to the two employees only the "tasklist", "shutdown", and "native" graphical components would be displayed on the dashboard displayed on their workstation.

On line [002], the application program is also assigned a name (e.g., tasklist). The configuration section starts on line [003] and ends on line [012]. On line [004] it is stated that the information that will be read from line [005] should be treated as a text block. A name or "Title" to the configuration information is assigned on line [005]. This may be used to display a text in the case of a dashboard where text is to be displayed or tool tips.

The "Title" can have two values, a default value (i.e., a German Title as called for on line [008]) or a value of a particular locale (a Japanese Title in this case as stated on line [009]). Thus, if the system fails to find a locale specific value that matches the system setting, then use the default which will have been set at the very beginning of the XML configuration file. The rest of the lines are used to close tags. In XML, each tag that is opened (e.g., <application>) must be closed (e.g., </application>).

Note that the invention is not restricted to only those two languages (i.e., Japanese and German). There can be as many languages defined in that section as needed. For example, if the system is anticipated to be used in ten countries having each a different language, there may be ten different languages defined in that section.

Note also that although in this present example the configuration file is an XML file, the invention is not limited to the use of XML files. Any other type of file may be used so long as the file contains configuration information for all application instances that may be displayed on a dashboard. Thus, the use of an XML file as the configuration file is for illustrative purposes only. In addition, note that the invention is not restricted to having the XML configuration file be stored on server 104. The XML configuration file may be stored on one or all of clients 108, 110 and 112 in conjunction to or instead of being stored on server 104. Obviously, if the XML configuration file is stored on a local system, it need not be downloaded from another system. By contrast, if the XML configuration file is stored on a peer system, instead of or in conjunction to being stored on server 104, it may be downloaded from the peer system or from either the peer system or the server 104, respectively.

Figure 5:
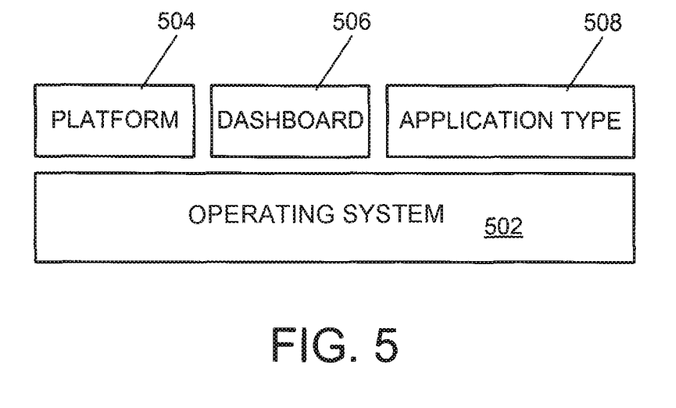
FIG. 5 is a conceptual view of a plurality of plug-ins that may be used by the present invention.

In conjunction with the XML configuration file, the present invention makes use of a plurality of plug-ins. A plug-in is a software module that adds a specific feature or service to a system. FIG. 5 is a conceptual view of the plug-ins used by the invention in relation to the OS. As shown in the figure, platform 504 is plugged into operating system 502. Also plugged into operating system 502 and platform 504 as well as to each other are dashboard 506 and application type 508.

Platform plug-in 504 is used to parse the XML configuration file for configured applications. For each application listed in the XML configuration file, the platform plug-in 504 will create an applicationInstance object. As is well known in the art, the object will have the type, identification, name, icon et cetera. needed to create an instance of the application.

When a dashboard is to be displayed on the screen of the client, dashboard plug-in 506 will request the application Instance objects from platform 504. After receiving the set of application Instance objects, the dashboard plug-in 506 will parse the set of objects to determine the application type (i.e., the particular application program to call). Dashboard plug-in 506 will call each application type in order for the application program to instantiate itself. An application type is a set of classes that takes the information on the application object and uses that data for the creation of the selectable application instance. There is an application type 508 for each application program in the XML configuration file. After calling all the application types 508, Dashboard plug-in 506 will display itself on the screen.

The dashboard plug-in 506 is a class that has an overall widget "theme" or "type" (i.e., tree, menu, table, voice, etc.). The application type 508 is responsible for determining this "theme" (i.e., the type of the calling dashboard) in order to create the appropriate widget as well as set the appropriate behavior of the widget when selected. After determining the type of the calling dashboard, the application type will instantiate itself and display itself as a widget on the dashboard that will have the look and feel and behavior corresponding to the type of the dashboard.

Figure 6:
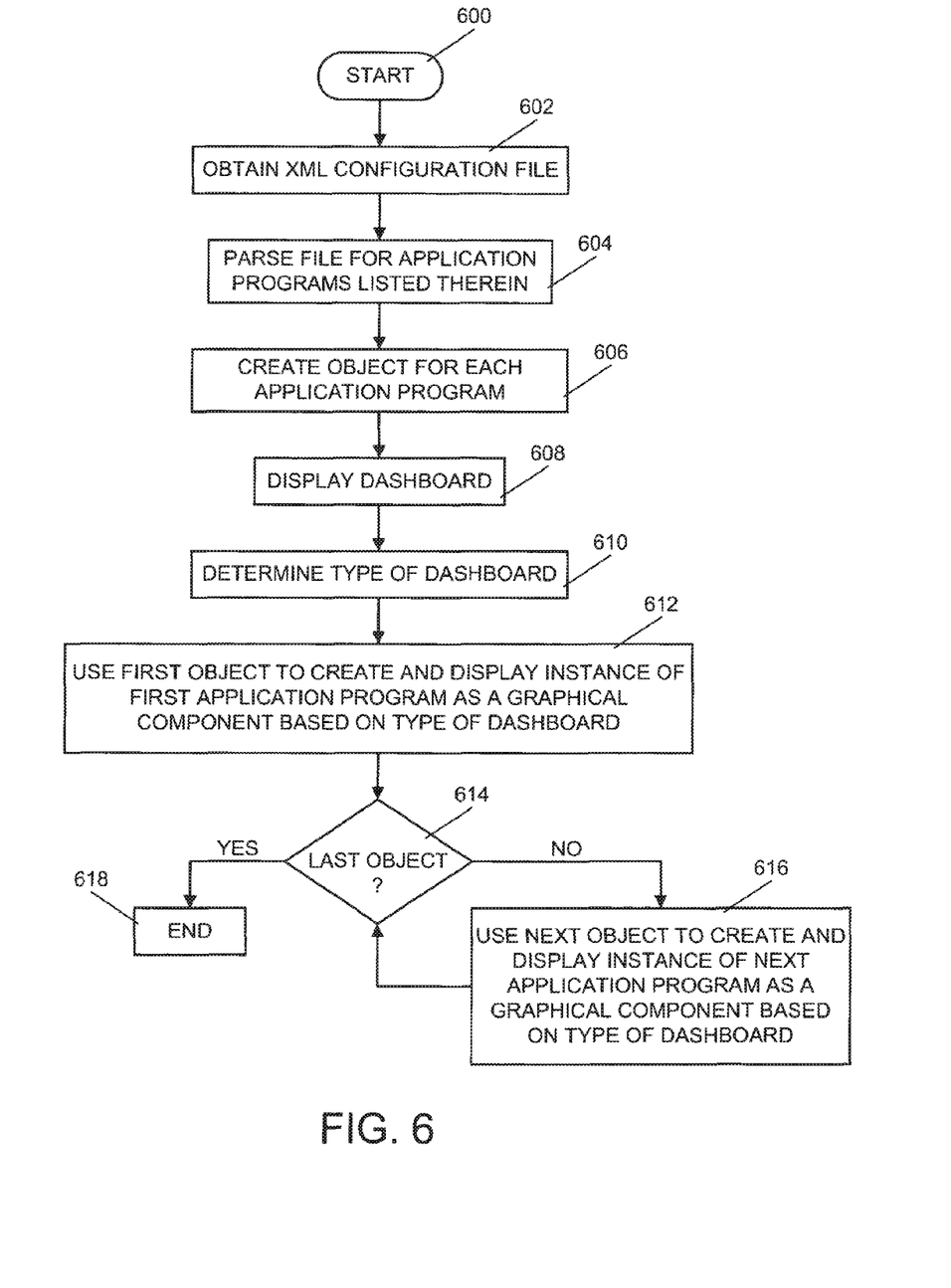
FIG. 6 is a flowchart of a process that may be used to implement the invention.

FIG. 6 is a flowchart of a process that may be used to implement the invention. The process starts when a client is turned on or is reset (step 600). After being turned on or reset, the client will download an XML configuration file from a server (step 602). In the XML configuration file will be a list of configured application programs. The list of configured application programs will include all application programs that are accessible by the client. The file will be parsed for the list of the configured application programs (step 604). For each configured application program, an applicationInstance object will be created (step 606). The dashboard to be displayed on the client will be instantiated (step 608). Each application object will be called. When an applicationInstance object is called, it will instantiate itself. Before instantiating itself, however, it will determine the type of the dashboard on which it is to be displayed by looking at the dashboard plug-in class. Based on the type of the dashboard, an appropriate graphical component will be displayed on the dashboard. The graphical component will have a look and feel and behavior based on the type of the dashboard (steps 610-616). After all the graphical components have been displayed, the process will end (step 618).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of displaying, on a display of a computer system, graphical components representing applications which are executable by an operating system (OS) executing on the computer system to which a user has access permission, the method comprising:

the computer system determining, at runtime, a predetermined control list to use, wherein the predetermined control list identifies each of the applications by an assigned unique identifier to which the user has the access permission and which are each to be represented by one of the graphical components, and wherein the predetermined control list used is associated with the user in response to a client device associated with the user performing one of a power on operation or a reset operation and is located on a selected one of a client, a server or a peer system;

creating an object, by the computer system using a platform plug-in, for each application of the applications in the predetermined control list to form a set of objects, wherein each object comprises information including a type, an identification, a name, and an icon needed to create an instance of a respective application;

parsing the set of objects, by the computer system using a dashboard plug-in, to determine an application type for a respective object;

the computer system determining, at runtime, using the application type in examining the dashboard plug-in, a particular type of calling dashboard from a set of types comprising a tree type, a menu type, a table type and a voice type to be used for the user, wherein the particular type of calling dashboard defines an overall theme that defines both a look of a dashboard and a behavior of the graphical components displayed on the dashboard when selected;

each application of the applications creating, in response to a determination of the particular type of calling dashboard at runtime, using an application type plug-in with a respective application type and the respective object, a selectable application instance as a respective graphical component for itself to form the graphical components representing the applications identified in the predetermined control list corresponding to the particular type of calling dashboard determined; and the computer system displaying on the dashboard, the created graphical components that represent the applications identified in the predetermined control list specifically for the particular type of calling dashboard determined.

2. The method of claim 1, wherein each created graphical component represents an instantiation of a given application of the applications identified in the predetermined control list.

3. The method of claim 2, wherein the predetermined control list identifies an emergency exit application to exit the computer system on which the graphical components are displayed in an emergency situation, and wherein the computer system is exited upon selection of a graphical component representing the emergency exit application.

4. The method of claim 2, wherein a calling dashboard is a plug-in to the OS and, wherein a platform plug-in to the OS is used to parse the predetermined control list for the applications to which the user has the access permission and to create the instantiation of each one of the applications to which the user has the access permission.

5. The method of claim 4, wherein an application type plug-in to the OS is used to create the selectable application instance for a particular application program identified in the predetermined control list.

6. The method of claim 5, wherein the application type plug-in determines an overall widget theme to create an appropriate widget as a graphical component representing an application in the predetermined control list and to set an appropriate behavior for the widget when selected.

7. The method of claim 6, wherein there is a given application type plug-in for each one of the applications identified in the predetermined control list that determines the overall widget theme in order to create an appropriate widget as a graphical component representing a given application in the predetermined control list and to set a given appropriate behavior for a given widget when selected.

8. The method of claim 1, wherein displaying on the dashboard the created graphic components comprises:

each application of the applications instantiating itself and displaying its respective graphical component on the dashboard.

9. The method of claim 1, wherein a plurality of types of calling dashboards comprises a menu type and a tree type, and wherein the graphical components are created using a same set of data notwithstanding which one of the plurality of types of calling dashboard is determined to be used at runtime.

10. A computer program product for displaying, on a display of a computer system, graphical components representing applications which are executable by an operating system (OS) executing on the computer system to which a user has access permission, comprising a non-transitory computer data storage medium having stored thereon computer program code which when executed by a processor direct the computer system to:

determine by the computer system, at runtime, a predetermined control list to use, wherein the predetermined control list identifies each of the applications by an assigned unique identifier to which the user has the access permission and which are each to be represented by one of the graphical components, and wherein the predetermined control list used is associated with the user in response to a client device associated with the user performing one of a power on operation or a reset operation and is located on a selected one of a client, a server or a peer system ;

create an object for each application of the applications in the predetermined control list to form a set of objects, wherein each object comprises information including a type, an identification, a name, and an icon needed to create an instance of a respective application;

parse the set of objects using a dashboard plug-in to determine an application type for a respective object;

determine by the computer system, at runtime, using the application type in examining the dashboard plug-in, a particular type of calling dashboard from a set of types comprising a tree type, a menu type, a table type and a voice type to be used for the user, wherein the particular type of calling dashboard defines an overall theme that defines both a look of a dashboard and a behavior of the graphical components displayed on the dashboard when selected, and wherein the particular type of calling dashboard is a plug-in to the operating system;

create, for each application of the applications, in response to a determination of the particular type of calling dashboard at runtime, using an application type plug-in with a respective application type and the respective object, a selectable application instance as a respective graphical component for itself to form the graphical components representing the applications identified in the predetermined control list corresponding to the particular type of calling dashboard determined, wherein each created graphical component represents an instantiation of a given application of the applications identified in the predetermined control list; and display on the dashboard by the computer system the created graphical components that represent the applications identified in the predetermined control list, wherein a platform plug-in to the OS is used to parse the predetermined control list for the applications to which the user has the access permission and to create the instantiation of each one of the applications to which the user has the access permission specifically for the particular type of calling dashboard determined.

11. The computer program product of claim 10, wherein the predetermined control list identifies an emergency exit application to exit the computer system on which the graphical components are displayed in an emergency situation, and wherein the computer system is exited upon selection of a graphical component representing the emergency exit application.

12. The computer program product of claim 10, wherein an application type plug-in to the OS is used to create the selectable application instance for a particular application program identified in the predetermined control list.

13. The computer program product of claim 10, wherein program code for the computer system to display on the dashboard the created graphic components comprises:

program code for each application of the applications to instantiate itself and display its respective graphical component on the dashboard.

14. The computer program product of claim 10, wherein a plurality of types of calling dashboards comprises a menu type and a tree type, and wherein the graphical components are created using a same set of data notwithstanding which particular type of calling dashboard is determined to be used at runtime.

15. A system for displaying on a display of a computer system graphical components representing executable applications executable by an operating system (OS) executing on the computer system to which a user has access permission, comprising:

at least one storage device that stores code data; and
at least one processor that processes the code data to:
determine, at runtime, a predetermined control list to use, wherein the predetermined control list identifies each of the applications by an assigned unique identifier to which the user has the access permission and which are each to be represented by one of the graphical components, and wherein the predetermined control list used is associated with the user in response to a client device associated with the user performing one of a power on operation or a reset operation and is located on a selected one of a client, a server or a peer system;

create an object, for each application of the applications in the predetermined control list, list to form a set of objects, wherein each object comprises information including a type, an identification, a name, and an icon needed to create an instance of a respective application;

parse the set of objects, using a dashboard plug-in, to determine an application type for a respective object;

determine, at runtime, using the application type in examining the dashboard plug-in, a particular type of calling dashboard from a set of types comprising a tree type, a menu type, a table type and a voice type to be used for the user, wherein the particular type of calling dashboard defines an overall theme that defines both a look of a dashboard and a behavior of the graphical components displayed on the dashboard when selected;

create, using an application type plug-in with a respective application type and the respective object, a selectable application instance, by each application of the applications in response to a determination of the particular type of calling dashboard at runtime, as a respective graphical component for itself to form the graphical components representing the applications identified in the predetermined control list corresponding to the particular type of calling dashboard determined; and display on the dashboard the created graphical components that represent the applications identified in the predetermined control list specifically for the particular type of calling dashboard determined, wherein each created graphical component represents an instantiation of a given application of the applications identified in the predetermined control list, wherein the particular type of calling dashboard is a plug-in to the operating system, and wherein a platform plug-in to the OS is used to parse the predetermined control list for the applications to which the user has the access permission and to create the instantiation of each one of the applications to which the user has the access permission.

16. The system of claim 15, wherein the predetermined control list identifies an emergency exit application to exit the computer system on which the graphical components are displayed in an emergency situation, and wherein the computer system is exited upon selection of a graphical component representing the emergency exit application.

17. The system of claim 15, wherein an application type plug-in to the OS is used to create the selectable application instance for a particular application program identified in the predetermined control list.

18. The system of claim 15, wherein the program code data to display on the dashboard by the computer system the created graphic components comprises:
    code data for each application of the applications to instantiate itself and display its respective graphical component on the particular type of calling dashboard.

19. The system of claim 15, wherein a plurality of types of calling dashboards comprises a menu type and a tree type, and wherein the graphical components are created using a same set of data notwithstanding which particular type of calling dashboard is determined to be used at runtime.

* * * * *